Dec. 30. 1924.
J. R. SOUSA
1,521,405
AUTOMATIC PARCEL ASSORTING MACHINE
Filed April 28, 1922   6 Sheets-Sheet 1
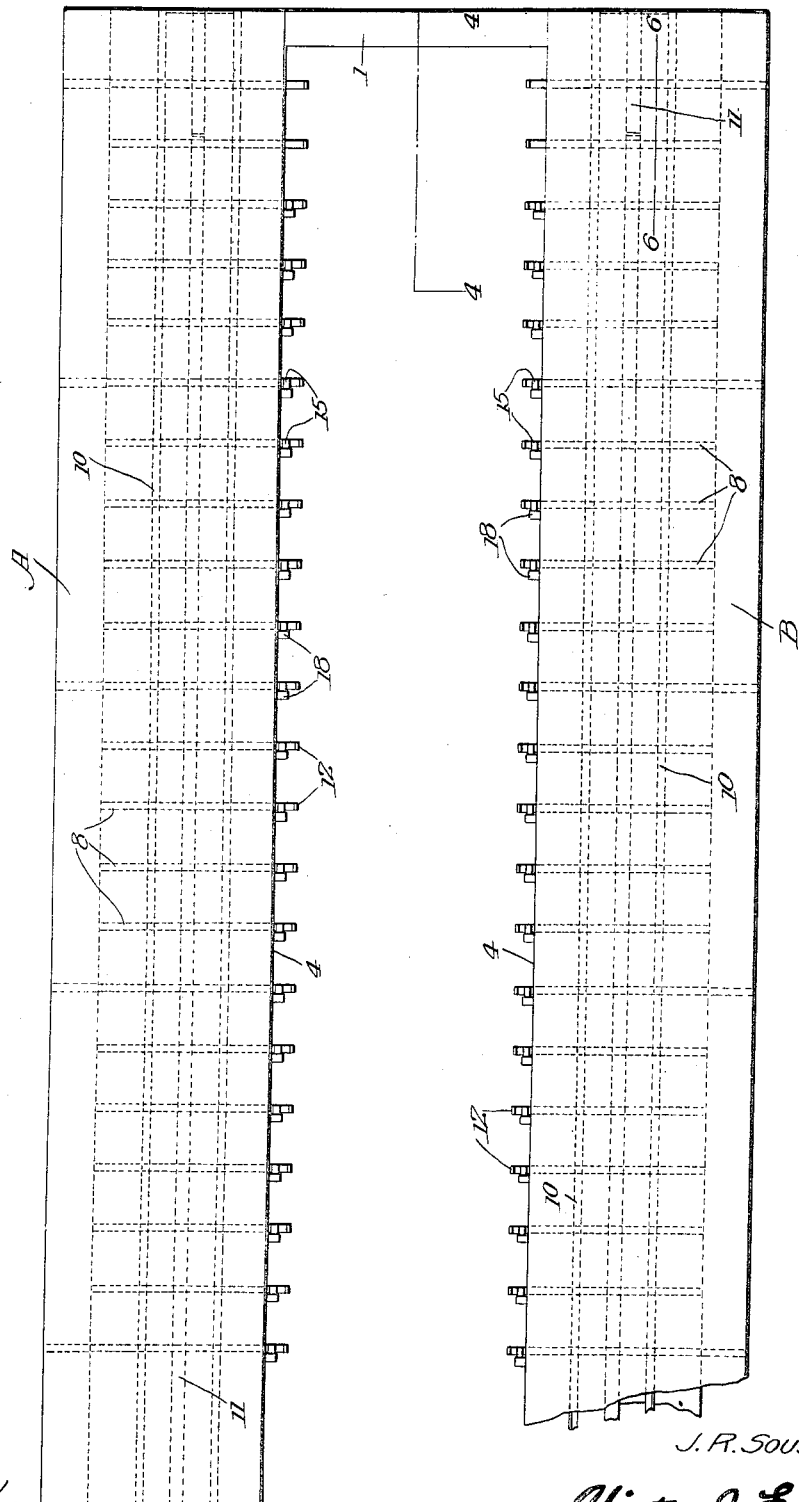

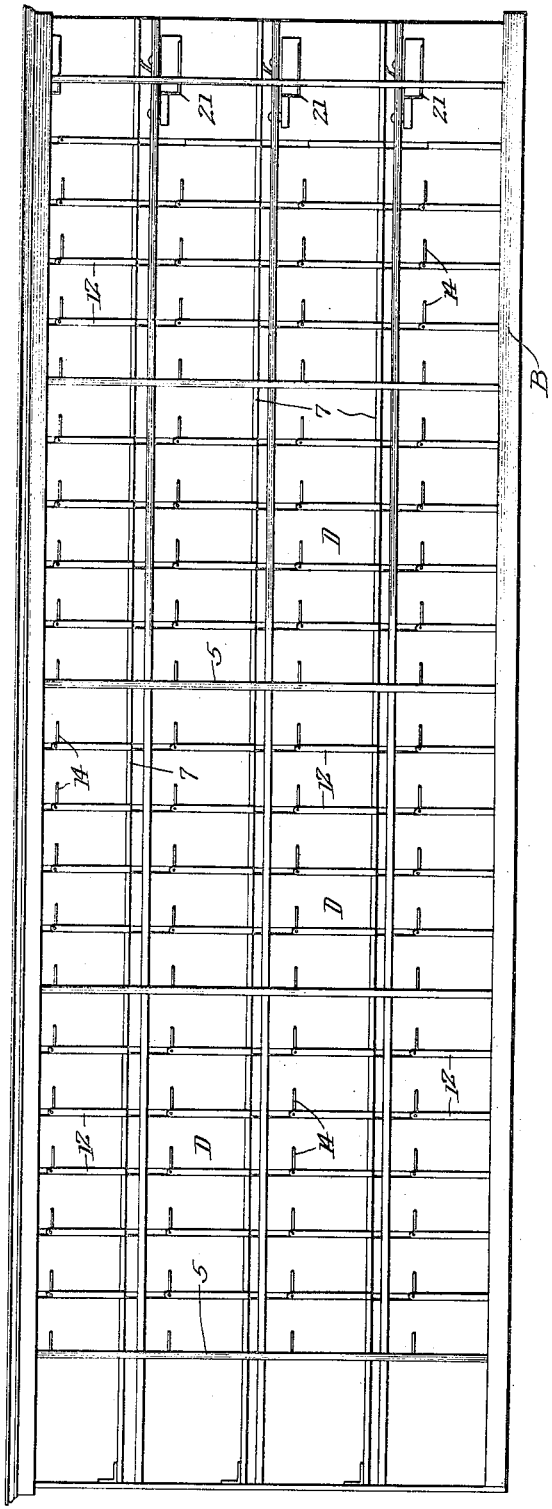

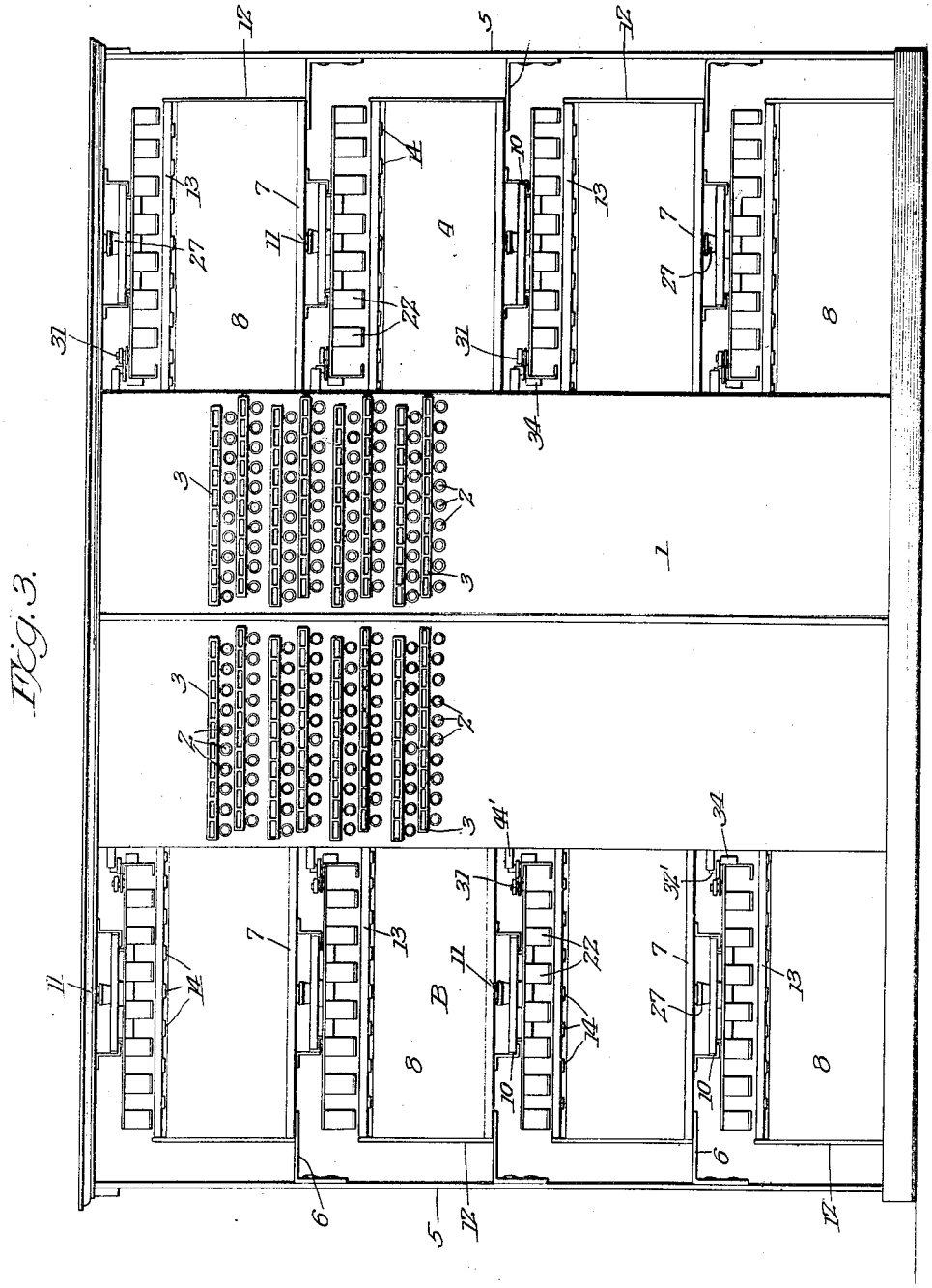

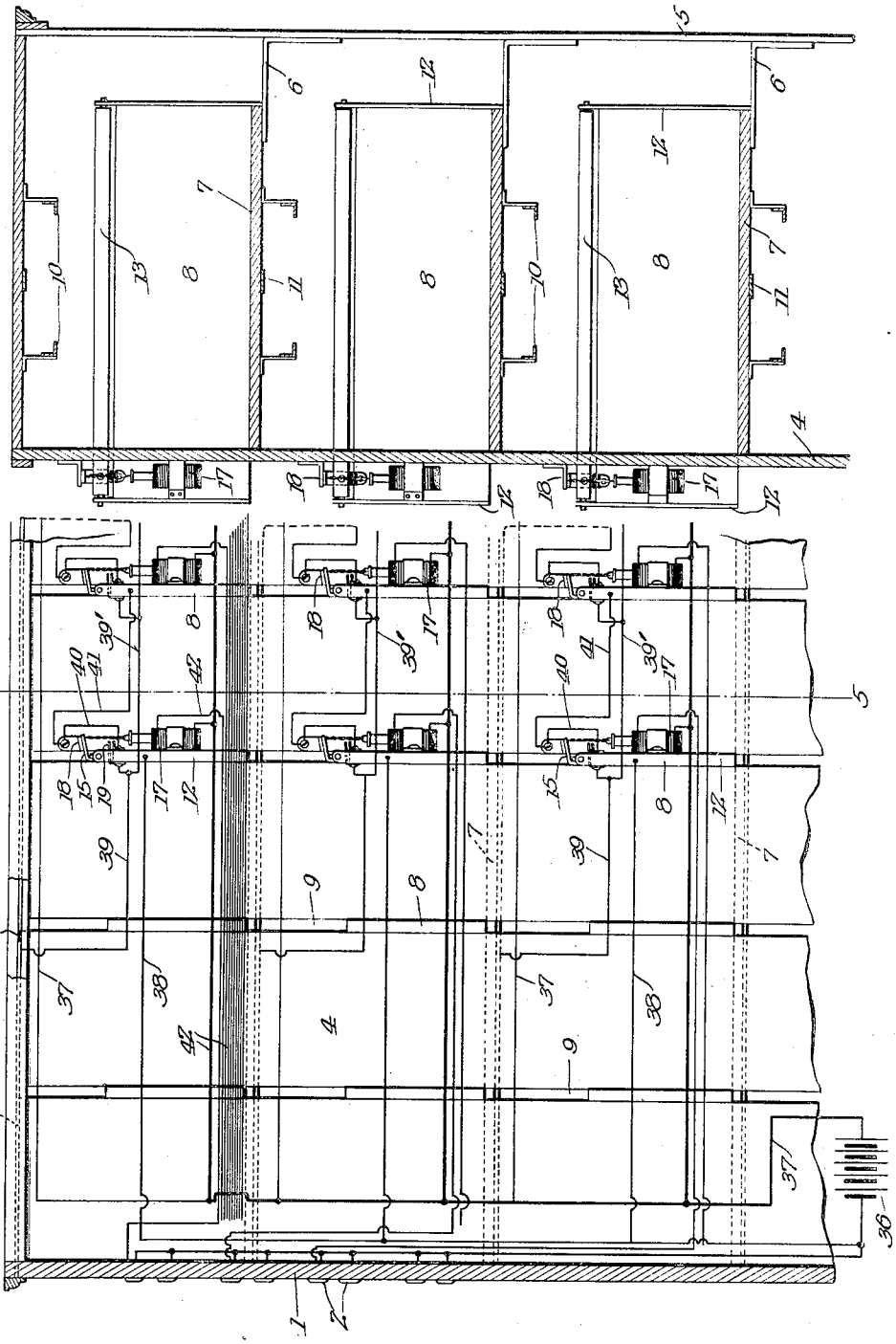

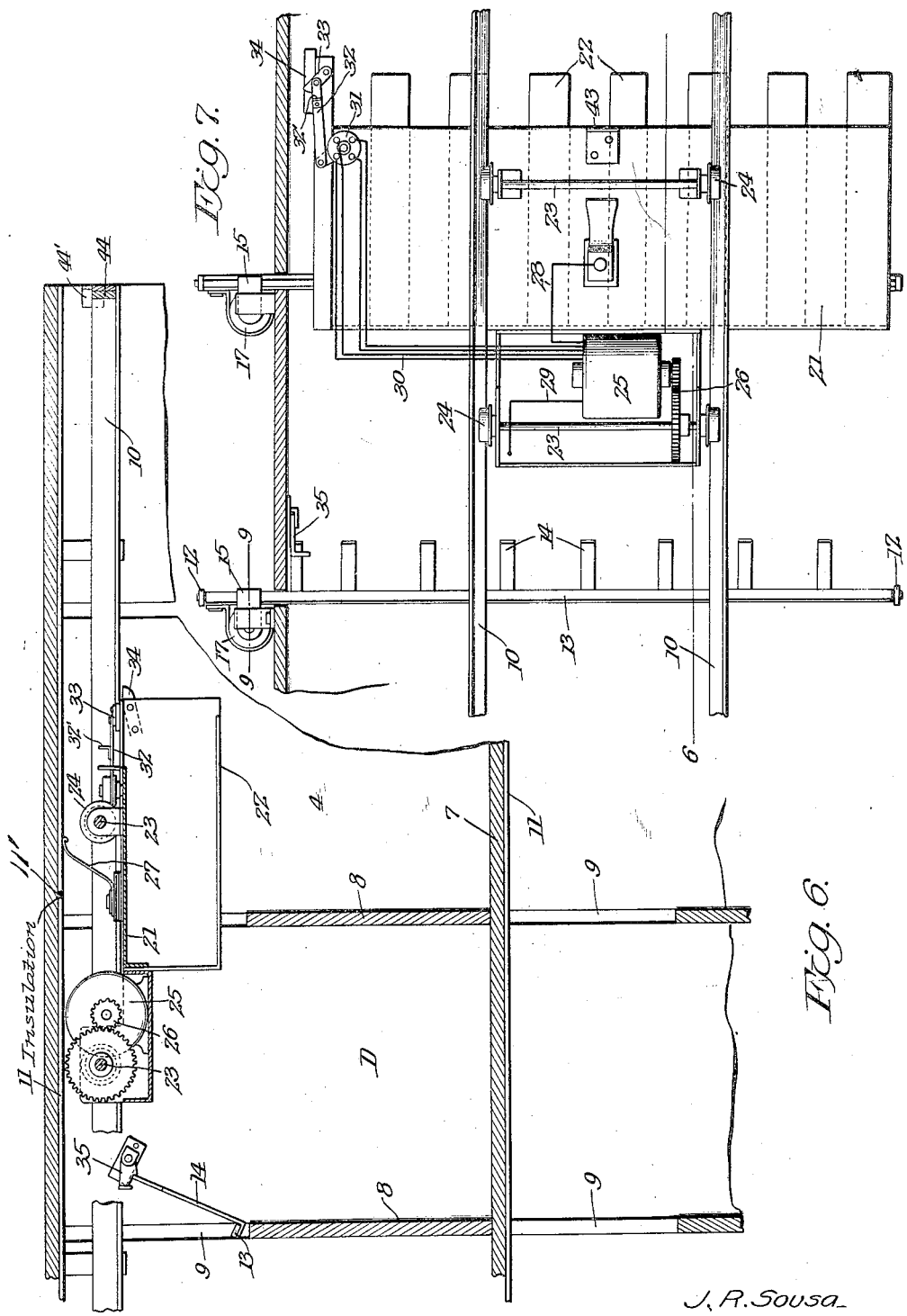

Dec. 30, 1924.　　　　　　　　　　　　　　　　　　1,521,405
J. R. SOUSA
AUTOMATIC PARCEL ASSORTING MACHINE
Filed April 28, 1922　　　6 Sheets-Sheet 6
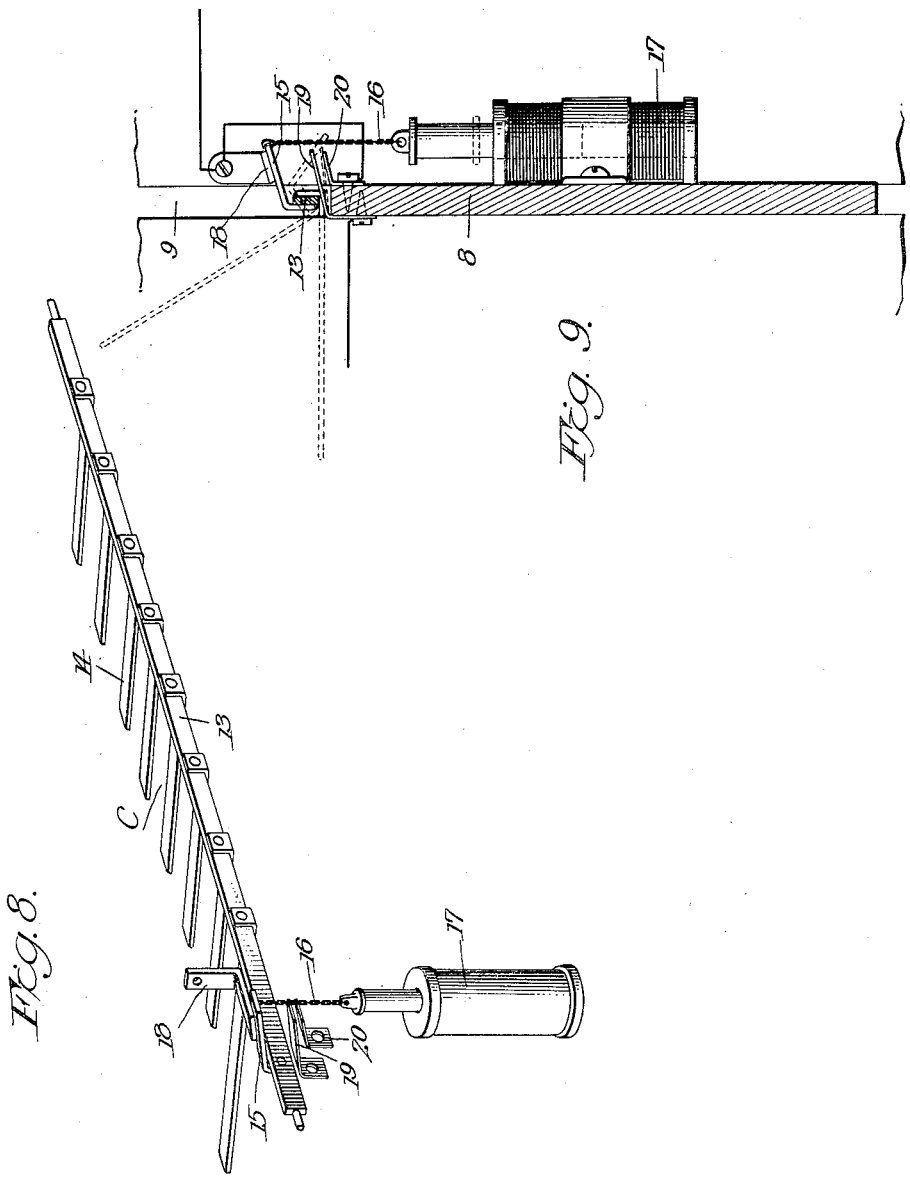

Patented Dec. 30, 1924.

1,521,405

UNITED STATES PATENT OFFICE.

JOHN ROBERT SOUSA, OF WASHINGTON, DISTRICT OF COLUMBIA.

AUTOMATIC PARCEL-ASSORTING MACHINE.

Application filed April 28, 1922. Serial No. 557,155.

*To all whom it may concern:*

Be it known that I, JOHN R. SOUSA, a citizen of the United States, residing at Washington, in the District of Columbia, have invented new and useful Improvements in Automatic Parcel-Assorting Machines, of which the following is a specification.

This invention relates to distributing machines for distributing laundry and other articles, the principal object of the invention being to provide conveyor means for conveying the articles from a certain point to a plurality of receiving points and key operated means for removing the articles from the conveyor means at any desired receiving point.

Another object of the invention is to provide electrical means for actuating the conveyor and the means for removing the articles from the conveyor, the keys acting as switches for controlling the supply of current to the parts.

A further object of the invention is to provide means for reversing the motor of the conveyor by the active releasing means or the means that have just been actuated by a key so that the empty conveyor will return to its starting point.

Another object of the invention is to provide a conductor section which is insulated from the rest of the trolley conductor, at the starting point for the conveyor, with means for supplying current to this section when a key is depressed so as to cause the motor of the conveyor to begin to actuate and thus move the conveyor along the track, the current flowing to the track and trolley conductor as long as the conveyor remains free of the insulated part of the conductor.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the invention.
Figure 2 is a side view thereof.
Figure 3 is a front view.
Figure 4 is a diagrammatic view showing a portion of the wiring.

Figure 5 is a section on line 5—5 of Figure 4.
Figure 6 is a section on line 6—6 of Figure 1.
Figure 7 is a plan view, with parts in section, showing the conveyor or car approaching a rake device which has been set into operative position by the depression of its key.
Figure 8 is a perspective view of one of the rake devices with its magnet.
Figure 9 is a section on line 9—9 of Figure 7.

The drawings show the apparatus as consisting of two sections A and B, though it will be understood that any number of sections may be used as desired. At one end the sections are connected together by the partition 1 upon which are placed the keys or push button switches 2 with their indicating plates 3. Each section is formed with an inner wall 4 and the outer open framework 5. Brackets 6 are secured to the framework 5 and these brackets and the wall 4 support the horizontal partitions 7 which form the bottoms for the article receiving compartments. The sides of these compartments are formed by the vertical partitions 8 which have their inner ends projecting through slots 9 formed in the wall 4. The tops of these partitions 8 are spaced from the under sides of the horizontal partitions 7 so as to leave a space for the conveyors or cars to pass through, said conveyors or cars being supported on the rails 10 which are suspended from the partitions 7. A conductor 11 is carried by each partition 7 between the rails of the track. Metal strips 12 are connected with the ends of each partition 8 and the upper ends of these strips project above the upper edge of the partition and are perforated to receive the reduced ends of the bar 13 of the rake device C. This bar 13 has secured thereto, in spaced relation, the prongs 14. An arm 15 is secured to each rake device and the outer end of this arm is connected by a chain 16 or the like with the core of a solenoid 17, the parts being so arranged that when the solenoid is energized the core will be moved downwardly and the rake device tilted to throw its prongs upwardly into the path of the conveyor or car. When the rake device is in its lower or normal position the arm 15 will engage a contact plate 18 and when the rake device is in raised position the arm 15 will engage a contact plate 19 and press it into engagement with a contact plate 20, the plates 18, 19 and 20 not only acting as stops to limit the movement of the rake device but also acting as electrical switch means as hereinafter described. The contact plates 19 and 20 are arranged one in each side of each partition 8 which is of wood or other non-conducting material so that the two plates are insulated from each other and from the other parts.

Each conveyor or car consists of a body 21, the rear end of which is open and the front end of the body being formed of the spaced strips 22, these strips being so arranged that the prongs of the rake devices will pass between them when said rake devices are in raised position. Thus the rake device will remove an article placed in the conveyor and cause it to drop into the compartment D. The conveyor is provided with the axles 23 for the wheel 24 which engage the rails of the track and with a motor 25 which is geared to one of the axles, as shown at 26. A trolley device 27 is carried by the conveyor for engaging the conductor 11, this trolley device being electrically connected with the motor by the conductor 28 and the motor being electrically connected with one of the axles and its wheels by the conductor 29. The motor is also connected by the two pairs of conductors 30 with a reversing switch 31 which is located at one end of the conveyor and has its arm connected by a link 32 with a lever 33 which is pivoted to one end of the conveyor. This end of the conveyor also carries a cam 34. A pivoted latch lever 35 is provided for each rake device, this lever being adapted to engage one of the prongs of the device, when the device is raised, and thus hold the device in raised position. This latch device is also arranged to be engaged by the lever 33 so that said lever will be swung rearwardly and reverse the switch and thus cause the motor to operate in an opposite direction so as to return the conveyor to its starting point. Just before the conveyor starts upon its return movement the cam 34 will strike the latch lever and raise the same, thus freeing the rake device and permitting it to fall under the action of gravity. The front part of each of the conductors 11 is insulated from the rest of the conductor, as shown at 11', so that when the trolley device is engaging this insulated part of the conductor no current will pass through the motor.

A battery 36 or other source of electrical supply is electrically connected with each track by the conductors 37 and with one of the strips 12 of the first partition 8 of each row by the conductor 38. A conductor 39 connects the contact plate 19 of the first compartment of each row with the insulated part 11' of the trolley conductor and the other contact plates 19 in each row are connected with this conductor 39 by the conductors 39'. A conductor 40 connects each of the contact plates 20 with the adjacent contact plate 18 and a conductor 41 connects each contact plate 18 with the next strip 12, the last conductor 41 being connected with the trolley conductor 11. Each magnet or solenoid 17 is electrically connected with the battery and with the key by the conductors 42 so that when a key is depressed current will flow to the magnet, the circuit of which is controlled by said key, thus energizing the same and causing its core to descend so as to raise the rake device to which the core is connected and move the contact plate 15 in engagement with the contact plates 19 and 20, thus forcing said contact plates 19 and 20 into engagement with each other. Current will then flow from the battery through the conductor 38, strip 12, plate 15, plate 19, conductor 39 to the part 11' of the trolley conductor. This current will then pass through the trolley device 27 to the motor through the frame and wheels of the conveyor to the track and return to the battery by the conductor 37. Current will also flow to the other part of the trolley conductor 11 through plate 20 which is in engagement with plate 19, conductor 40, plate 18, conductor 41 and the strips 12 and their contact plates 15 and the plates 18 through the conductors to the conductor trolley 11 so that as soon as the conveyor engages this part of the trolley conductor its motor will be supplied with current and the current will continue to flow until the conveyor returns to the insulated part 11' of the trolley conductor.

The rake device which has been raised by the solenoid will be held in raised position by the latch lever 35 so that the button can be released. As the conveyor approaches the raised rake device the prongs of said device will pass between the strips forming part of the body of the conveyor and thus push the article carried by the conveyor into the compartment D with which the rake device is associated. The switch lever 33 will then be struck by the latch lever so that the switch will be reversed and the motor caused to operate in an opposite direction so that the conveyor will be returned to its starting point. Just before this return movement, however, the cam 34 will strike the latch lever and raise the same out of engagement with the rake device so as to permit the rake device to fall. This movement of the rake device will disengage the contact plates 19 and 20 from each other and thus the supply of current to the insulated part 11' of the trolley conductor will be broken but current will continue to flow to the rest of the conductor as the plate 15 will be engaging the plate 18 and current will flow from the battery through the strip 12, plate 15, plate 18 and the conductors which are connected with the plates 18 and the strips 12 to the trolley conductor 11. As soon as the conveyor strikes the insulated part 11' of the trolley conductor the motor will cease to operate and thus the conveyor will come to rest. I may provide a stop 43 on the conveyor for engaging a stop 44 at the front end of the track for preventing the conveyor from running off the track.

The compartments would be properly designated and each key would have the same designation in its plate 3 so that the operator would know which key to depress in order to send the coveyor to the proper compartment.

From the above it will be seen that it is simply necessary to depress a key to cause the conveyor to run to a certain compartment where the bundle or article carried by the conveyor will be deposited in the compartment and then the conveyor will return to its starting point to receive a new bundle. Thus bundles or articles can be easily and quickly distributed in the compartments according to names or otherwise. The open framework at the front sides of the compartment permit the bundles to be removed when desired.

As will be seen the magnets or solenoids are placed upon the projecting ends of the partitions 8 so that said parts are not located in the compartments but are located in the space between the two sections. The contact plates are also located outside of the compartments and thus the electrical parts may be easily inspected and adjusted from the space between the two sections.

In order to return the switch 31 to its starting point upon the return of the carriage to its starting point I provide a small stop 32' on the link 32 which will strike a stop 44' at the front end of the apparatus just before the stop 43 strikes the stop 44. Thus the switch parts will be returned to their starting point ready to receive the current, when the insulated part of the trolley conductor is energized again so as to actuate the motor to propel the car in a forward direction.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A distributing machine comprising a plurality of receiving compartments, means for conveying articles thereto including an electrically operated carriage, electrically operated means associated with each compartment for transferring articles from the carriage to the compartment as the carriage moves past it, circuits for the transferring means and the carriage, manually operated switches in said circuits and means for automatically stopping the carriage at the compartment whose transferring means are in active position and returning the carriage to its starting point.

2. A distributing machine comprising a plurality of receiving compartments, means for conveying articles thereto including an electrically operated carriage and its motor, electrically operated means associated with each compartment for transferring articles from the carriage to the compartment as the carriage moves past it, switch means for controlling the supply of current to such means, means associated with the transferring means for supplying current to the carriage when such transferring means are actuated and means for automatically stopping the carriage at the compartment, the transferring means of which are in active position and returning the carriage to its starting point.

3. A distributing machine comprising a plurality of receiving compartments, means for conveying articles thereto including an electrically operated carriage, electrically operated means associated with each compartment for transferring articles from the carriage to the compartment as the carriage moves past it, switch means for controlling the supply of current to the transferring means, means associated with the transferring means for supplying current to the carriage when said transferring means are in active position and means for automatically stopping the carriage at the compartment the transferring means of which are in active position and returning the carriage to its starting point, such automatic means including a reversing switch on the carriage and in electrical connection with the motor thereof and means operable by the transferring means for actuating the switch to reverse the motor.

4. A distributing machine comprising a plurality of receiving compartments, means for conveying articles thereto including an electrically operated carriage and its motor, electrically operated means associated with each compartment for transferring articles from the carriage to the compartment as the carriage moves past it, switch means for controlling the supply of current to such transferring means, means associated with the transferring means for supplying current to the motor of the carriage when such transferring means are active and means for automatically stopping the carriage at the compartment, the transferring means of which are active and returning the carriage to its starting point, such automatic means comprising a latch member for holding the transferring means in active position, a reversing switch on the carriage, electrically connected with the motor, and adapted to be actuated by the latch member and a cam on the carriage for moving the latch member to inactive position to release the transferring means.

5. A distributing machine comprising a plurality of receiving compartments, an electrically operated carriage for delivering articles to the compartments, an electric motor on the carriage, a track and a trolley conductor for the carriage, means for insulating the front end of the trolley conductor from the rest thereof, electrically operated transferring means associated with each compartment for transferring articles from the carriage to the compartments when the carriage moves past them, switch means for controlling the supply of current to the transferring means and means for supplying current to the insulated part of the trolley conductor when the transferring means are in active position to start the motor of the carriage, the circuit to the rest of the conductor being completed as long as the trolley of the carriage is in contact with this part of the conductor.

6. A distributing machine comprising a plurality of receiving compartments, an electrically operated carriage for delivering articles to such compartments, a track and trolley conductor for the carriage, said conductor having the front part insulated from its other part, a rake device associated with each compartment, electro-magnetic means for raising the rake devices to cause them to transfer articles from the carriage to the compartments as the carriage moves past them, circuits for the electro-magnetic means, switch buttons for controlling the circuits, means for supplying current to the insulated part of the conductor by the movement of the rake devices into active position and means associated with the rake devices and with the carriage for stopping the carriage at the compartment, the rake device of which is in active position, and returning the carriage to its starting point.

In testimony whereof I affix my signature.

JOHN ROBERT SOUSA.